US012681644B2

(12) United States Patent
Kim

(10) Patent No.: US 12,681,644 B2
(45) Date of Patent: Jul. 14, 2026

(54) EFFICIENT COMMAND PROTOCOL

(71) Applicant: Micron Technology, Inc., Boise, ID (US)

(72) Inventor: Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 18/790,956

(22) Filed: Jul. 31, 2024

(65) Prior Publication Data

US 2025/0094054 A1     Mar. 20, 2025

Related U.S. Application Data

(60) Provisional application No. 63/590,718, filed on Oct. 16, 2023, provisional application No. 63/582,658, filed on Sep. 14, 2023.

(51) Int. Cl.
G06F 3/06 (2006.01)
(52) U.S. Cl.
CPC .......... G06F 3/0613 (2013.01); G06F 3/0659 (2013.01); G06F 3/0673 (2013.01)
(58) Field of Classification Search
CPC ..... G06F 3/0613; G06F 3/0659; G06F 3/0673
See application file for complete search history.

(56) References Cited

U.S. PATENT DOCUMENTS

| 12,498,751 B2 * | 12/2025 | Cho ........................... G06F 1/06 |
|---|---|---|
| 2009/0190432 A1 * | 7/2009 | Bilger ................. G11C 11/4096 |
| | | 365/230.06 |
| 2020/0142878 A1 * | 5/2020 | Varadarajan .............. G06F 7/14 |
| 2020/0319882 A1 * | 10/2020 | Liang ..................... G06F 9/4806 |
| 2021/0193209 A1 * | 6/2021 | Swami ................. G11C 11/2275 |
| 2021/0407574 A1 * | 12/2021 | Kim ...................... G11C 7/1072 |
| 2022/0253232 A1 * | 8/2022 | Gyllenskog ........... G06F 3/0604 |

OTHER PUBLICATIONS

Steiner, Lukas, et al. "Unveiling the Real Performance of LPDDR5 Memories." Proceedings of the 2022 International Symposium on Memory Systems. 2022. (Year: 2022).*

* cited by examiner

*Primary Examiner* — Nicholas J Simonetti
(74) *Attorney, Agent, or Firm* — Colby Nipper PLLC

(57) ABSTRACT

This document describes apparatuses and techniques for an efficient command protocol for memory access. In various aspects, a memory controller may implement combined operations of different command types (e.g., an activation command plus a read, an activation command plus a write, or an activation command plus a pre-charge command) to better utilize a multiple clock ratio of a command bus (e.g., a (1.5+0.5)N operation in a dual clocking WCK2CK ratio of 4:1), which may improve utilization of a data bus for associated memory responses. By so doing, the efficient command protocol may improve power efficiency and system level performance of a computing system.

20 Claims, 12 Drawing Sheets

| Command | CS Pin | DDR Command / Address Pin | | | | | | | CK |
|---|---|---|---|---|---|---|---|---|---|
| | CS | CA0 | CA1 | CA2 | CA3 | CA4 | CA5 | CA6 | Edge |
| ACT-1 | H | H | H | H | R14 | R15 | R16 | R17 | R1 |
| | X | BA0 | BA1 | BG0 | BG1 | R11 | R12 | R13 | F1 |
| ACT-2 | H | H | H | L | R7 | R8 | R9 | R10 | R1 |
| | X | R0 | R1 | R2 | R3 | R4 | R5 | R6 | F1 |
| READ | H | H | L | L | C0 | C3 | C4 | C5 | R1 |
| | X | BA0 | BA1 | BG0 | BG1 | C1 | C2 | AP | F1 |
| WRITE | H | L | H | H | C0 | C3 | C4 | C5 | R1 |
| | X | BA0 | BA1 | BG0 | BG1 | C1 | C2 | AP | F1 |
| PRE | H | L | L | L | H | H | H | H | R1 |
| | X | BA0 | BA1 | BG0 | BG1 | V | V | AB | F1 |

600 —

| Command | CS Pin | DDR Command / Address Pin | | | | | | | | | CK Edge |
|---|---|---|---|---|---|---|---|---|---|---|---|
| | CS | CA0 | CA1 | CA2 | CA3 | CA4 | CA5 | CA6 | CA7 | CA8 | |
| ACT | H | H | H | R20 | R19 | R18 | BA0 | BA1 | BG0 | BG1 | R1 |
| | L | R9 | R10 | R11 | R12 | R13 | R14 | R15 | R16 | R17 | F1 |
| | L | R0 | R1 | R2 | R3 | R4 | R5 | R6 | R7 | R8 | R2 |
| | V | V | V | V | V | V | V | V | V | V | F2 |
| ACT followed by READ | H | H | H | R20 | R19 | R18 | BA0 | BA1 | BG0 | BG1 | R1 |
| | H | R9 | R10 | R11 | R12 | R13 | R14 | R15 | R16 | R17 | F1 |
| | H | R0 | R1 | R2 | R3 | R4 | R5 | R6 | R7 | R8 | R2 |
| | CS | C0 | C1 | C2 | C3 | C4 | BA0 | BA1 | BG0 | BG1 | F2 |
| ACT followed by WRITE | H | H | H | R20 | R19 | R18 | BA0 | BA1 | BG0 | BG1 | R1 |
| | H | R9 | R10 | R11 | R12 | R13 | R14 | R15 | R16 | R17 | F1 |
| | L | R0 | R1 | R2 | R3 | R4 | R5 | R6 | R7 | R8 | R2 |
| | C5 | C0 | C1 | C2 | C3 | C4 | BA0 | BA1 | BG0 | BG1 | F2 |
| ACT followed by PRE | H | H | H | R20 | R19 | R18 | BA0 | BA1 | BG0 | BG1 | R1 |
| | L | R9 | R10 | R11 | R12 | R13 | R14 | R15 | R16 | R17 | F1 |
| | H | R0 | R1 | R2 | R3 | R4 | R5 | R6 | R7 | R8 | R2 |
| | V | V | V | V | V | AB | BA0 | BA1 | BG0 | BG1 | F2 |
| READ | H | H | L | H | H | H | C5 | V | B0 | AP | R1 |
| | H | C0 | C1 | C2 | C3 | C4 | BA0 | BA1 | BG0 | BG1 | F1 |
| WRITE | H | H | L | H | H | L | C5 | V | V | AP | R1 |
| | H | C0 | C1 | C2 | C3 | C4 | BA0 | BA1 | BG0 | BG1 | F1 |
| PRE | H | H | L | H | L | H | V | V | V | AB | R1 |
| | H | V | V | V | V | V | BA0 | BA1 | BG0 | BG1 | F1 |

| Command | CS Pin | DDR Command / Address Pin | | | | | | | | | CK Edge |
| | CS | CA0 | CA1 | CA2 | CA3 | CA4 | CA5 | CA6 | CA7 | CA8 | |
|---|---|---|---|---|---|---|---|---|---|---|---|
| ACT | H | H | H | L | R19 | R18 | BA0 | BA1 | BG0 | BG1 | R1 |
| | L | R9 | R10 | R11 | R12 | R13 | R14 | R15 | R16 | R17 | F1 |
| | V | R0 | R1 | R2 | R3 | R4 | R5 | R6 | R7 | R8 | R2 |
| | V | V | V | V | V | V | V | V | V | V | F2 |
| ACT followed by READ | H | H | H | H | R19 | R18 | BA0 | BA1 | BG0 | BG1 | R1 |
| | H | R9 | R10 | R11 | R12 | R13 | R14 | R15 | R16 | R17 | F1 |
| | AP | R0 | R1 | R2 | R3 | R4 | R5 | R6 | R7 | R8 | R2 |
| | C5 | C0 | C1 | C2 | C3 | C4 | BA0 | BA1 | BG0 | BG1 | F2 ← |
| ACT followed by WRITE | H | H | H | H | R19 | R18 | BA0 | BA1 | BG0 | BG1 | R1 |
| | L | R9 | R10 | R11 | R12 | R13 | R14 | R15 | R16 | R17 | F1 |
| | AP | R0 | R1 | R2 | R3 | R4 | R5 | R6 | R7 | R8 | R2 |
| | C5 | C0 | C1 | C2 | C3 | C4 | BA0 | BA1 | BG0 | BG1 | F2 ← |
| ACT followed by PRE | H | H | H | L | R19 | R18 | BA0 | BA1 | BG0 | BG1 | R1 |
| | H | R9 | R10 | R11 | R12 | R13 | R14 | R15 | R16 | R17 | F1 |
| | V | R0 | R1 | R2 | R3 | R4 | R5 | R6 | R7 | R8 | R2 |
| | V | V | V | V | V | AB | BA0 | BA1 | BG0 | BG1 | F2 ← |

702

| Command | CS Pin | DDR Command / Address Pin | | | | | | | | | CK Edge |
| | CS | CA0 | CA1 | CA2 | CA3 | CA4 | CA5 | CA6 | CA7 | CA8 | |
|---|---|---|---|---|---|---|---|---|---|---|---|
| ACT | H | H | H | L | L | R18 | BA0 | BA1 | BG0 | BG1 | R1 |
| | V | R9 | R10 | R11 | R12 | R13 | R14 | R15 | R16 | R17 | F1 |
| | V | R0 | R1 | R2 | R3 | R4 | R5 | R6 | R7 | R8 | R2 |
| | V | V | V | V | V | V | V | V | V | V | F2 |
| ACT followed by READ | H | H | H | H | H | R18 | BA0 | BA1 | BG0 | BG1 | R1 |
| | B0 | R9 | R10 | R11 | R12 | R13 | R14 | R15 | R16 | R17 | F1 |
| | AP | R0 | R1 | R2 | R3 | R4 | R5 | R6 | R7 | R8 | R2 |
| | C5 | C0 | C1 | C2 | C3 | C4 | BA0 | BA1 | BG0 | BG1 | F2 ← |
| ACT followed by WRITE | H | H | H | H | L | R18 | BA0 | BA1 | BG0 | BG1 | R1 |
| | V | R9 | R10 | R11 | R12 | R13 | R14 | R15 | R16 | R17 | F1 |
| | AP | R0 | R1 | R2 | R3 | R4 | R5 | R6 | R7 | R8 | R2 |
| | C5 | C0 | C1 | C2 | C3 | C4 | BA0 | BA1 | BG0 | BG1 | F2 ← |
| ACT followed by PRE | H | H | H | L | H | R18 | BA0 | BA1 | BG0 | BG1 | R1 |
| | V | R9 | R10 | R11 | R12 | R13 | R14 | R15 | R16 | R17 | F1 |
| | V | R0 | R1 | R2 | R3 | R4 | R5 | R6 | R7 | R8 | R2 |
| | V | V | V | V | V | AB | BA0 | BA1 | BG0 | BG1 | F2 ← |

| Command | CS Pin | DDR Command / Address Pin | | | | | | | | | CK |
| | CS | CA0 | CA1 | CA2 | CA3 | CA4 | CA5 | CA6 | CA7 | CA8 | Edge |
|---|---|---|---|---|---|---|---|---|---|---|---|
| ACT followed by PRE | H | H | H | R20 | R19 | R18 | BA0 | BA1 | BG0 | BG1 | R1 |
| | L | R9 | R10 | R11 | R12 | R13 | R14 | R15 | R16 | R17 | F1 |
| | H | R0 | R1 | R2 | R3 | R4 | R5 | R6 | R7 | R8 | R2 |
| | AB | BA0_0 | BA1_0 | BG0_0 | BG1_0 | 2PRE | BA0_1 | BA1_1 | BG0_1 | BG1_1 | F2 |
| PRE | H | H | L | H | L | H | V | V | V | AB | R1 |
| | H | BA0_0 | BA1_0 | BG0_0 | BG1_0 | 2PRE | BA0 | BA1 | BG0 | BG1 | F1 |

Combine a first memory command with a second
memory command to provide a combined memory command
that is a multiple of a period of a command bus clock
902

Communicate, via the command bus, the
combined memory command to a memory device
904

Receive, via a data bus, a response from the memory device
comprising a series of contiguous bits on the data bus
906

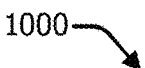

1000

```
┌─────────────────────────────────────────────────────┐
│        Determine that an activation command is queued │
│                          1002                         │
└─────────────────────────────────────────────────────┘
                           │
                           ▼
┌─────────────────────────────────────────────────────┐
│       Select a command to combine with the activation │
│       command to form a combined command sequence     │
│                          1004                         │
└─────────────────────────────────────────────────────┘
           │                              │
           ▼                              │
┌─────────────────────────┐              │
│     Assert a flag useful to │           │
│    implement the combined   │           │
│     command sequence        │           │
│            1006             │           │
└─────────────────────────┘              │
           │                              │
           ▼                              ▼
┌─────────────────────────────────────────────────────┐
│       Communicate the combined command sequence       │
│          to a memory device via a command bus         │
│                          1008                         │
└─────────────────────────────────────────────────────┘
           │                              │
           ▼                              │
┌─────────────────────────┐              │
│     Communicate another     │           │
│     command to the memory   │           │
│    device via the command bus │         │
│            1010             │           │
└─────────────────────────┘              │
           │                              │
           ▼                              ▼
┌─────────────────────────────────────────────────────┐
│        Receive, via a data bus, a response from the   │
│      memory device for the combined command sequence  │
│    that includes a contiguous group of bits on the data bus │
│                          1012                         │
└─────────────────────────────────────────────────────┘
```

| Command | CS Pin | DDR Command / Address Pin | | | | CK |
|---|---|---|---|---|---|---|
| | CS | CA0 | CA1 | CA2 | CA3 | Edge |
| ACT | H | H | H | BG0 | BG1 | R1 |
| | L | R18 | R19 | BA0 | BA1 | F1 |
| | L | R14 | R15 | R16 | R17 | R2 |
| | R9 | R10 | R11 | R12 | R13 | F2 |
| | R4 | R5 | R6 | R7 | R8 | R3 |
| | R0 | R1 | R2 | R3 | V | F3 |
| | V | V | V | V | V | R4 |
| | V | V | V | V | V | F4 |
| ACT followed by READ | H | H | H | BG0 | BG1 | R1 |
| | H | R18 | R19 | BA0 | BA1 | F1 |
| | H | R14 | R15 | R16 | R17 | R2 |
| | R9 | R10 | R11 | R12 | R13 | F2 |
| | R4 | R5 | R6 | R7 | R8 | R3 |
| | R0 | R1 | R2 | R3 | AP | F3 |
| | C3 | C4 | C5 | BG0 | BG1 | R4 |
| | C0 | C1 | C2 | BA0 | BA1 | F4 |
| ACT followed by WRITE | H | H | H | BG0 | BG1 | R1 |
| | H | R18 | R19 | BA0 | BA1 | F1 |
| | L | R14 | R15 | R2 | R3 | R2 |
| | R9 | R10 | R11 | R12 | R13 | F2 |
| | R4 | R5 | R6 | R7 | R8 | R3 |
| | R0 | R1 | R2 | R3 | AP | F3 |
| | C3 | C4 | C5 | BG0 | BG1 | R4 |
| | C0 | C1 | C2 | BA0 | BA1 | F4 |
| ACT followed by PRE | H | H | H | BG0 | BG1 | R1 |
| | L | R18 | R19 | BA0 | BA1 | F1 |
| | H | R14 | R15 | R16 | R17 | R2 |
| | R9 | R10 | R11 | R12 | R13 | F2 |
| | R4 | R5 | R6 | R7 | R8 | R3 |
| | R0 | R1 | R2 | R3 | AB | F3 |
| | V | V | V | BG0 | BG1 | R4 |
| | V | V | V | BA0 | BA1 | F4 |
| READ | H | H | L | H | H | R1 |
| | H | H | V | V | AP | F1 |
| | C3 | C4 | C5 | BG0 | BG1 | R2 |
| | C0 | C1 | C2 | BA0 | BA1 | F2 |
| WRITE | H | H | L | H | L | R1 |
| | H | H | V | V | AP | F1 |
| | C3 | C4 | C5 | BG0 | BG1 | R2 |
| | C0 | C1 | C2 | BA0 | BA1 | F2 |
| PRE | H | H | L | L | H | R1 |
| | H | H | V | V | AB | F1 |
| | V | V | V | BG0 | BG1 | R2 |
| | V | V | V | BA0 | BA1 | F2 |

FIG. 11

EFFICIENT COMMAND PROTOCOL

CROSS-REFERENCE TO RELATED APPLICATION(S)

This application claims the benefit of U.S. Provisional Patent Application Ser. No. 63/590,718, filed on Oct. 16, 2023, and of U.S. Provisional Patent Application Ser. No. 63/582,658, filed on Sep. 14, 2023, the disclosures of which are incorporated by reference herein in their entireties.

BACKGROUND

Computers, smartphones, and other electronic devices operate using processors and memories. A processor enables a user to run applications and programs by executing a set of instructions that process data. Generally, the processor obtains the set of instructions and data from a memory that stores this information. Advances in processors have often outpaced those of memory. This outpacing, along with many demands on memory devices, results in processor execution speeds that are often limited by the speed of memories. Applications on electronic devices may also operate on ever-larger data sets that require ever-larger memories. Further, manufacturers of memories or electronic devices may face demands for faster execution speeds of memories while also enabling power conservation of an electronic device. Memory access, however, often relies on legacy interfaces or timing schemes that are unable to meet these various demands for memory performance and power conservation.

BRIEF DESCRIPTION OF THE DRAWINGS

Apparatuses of and techniques for an efficient command protocol are described with reference to the following drawings. The same numbers are used throughout the drawings to reference like features and components:

Figure 4A:
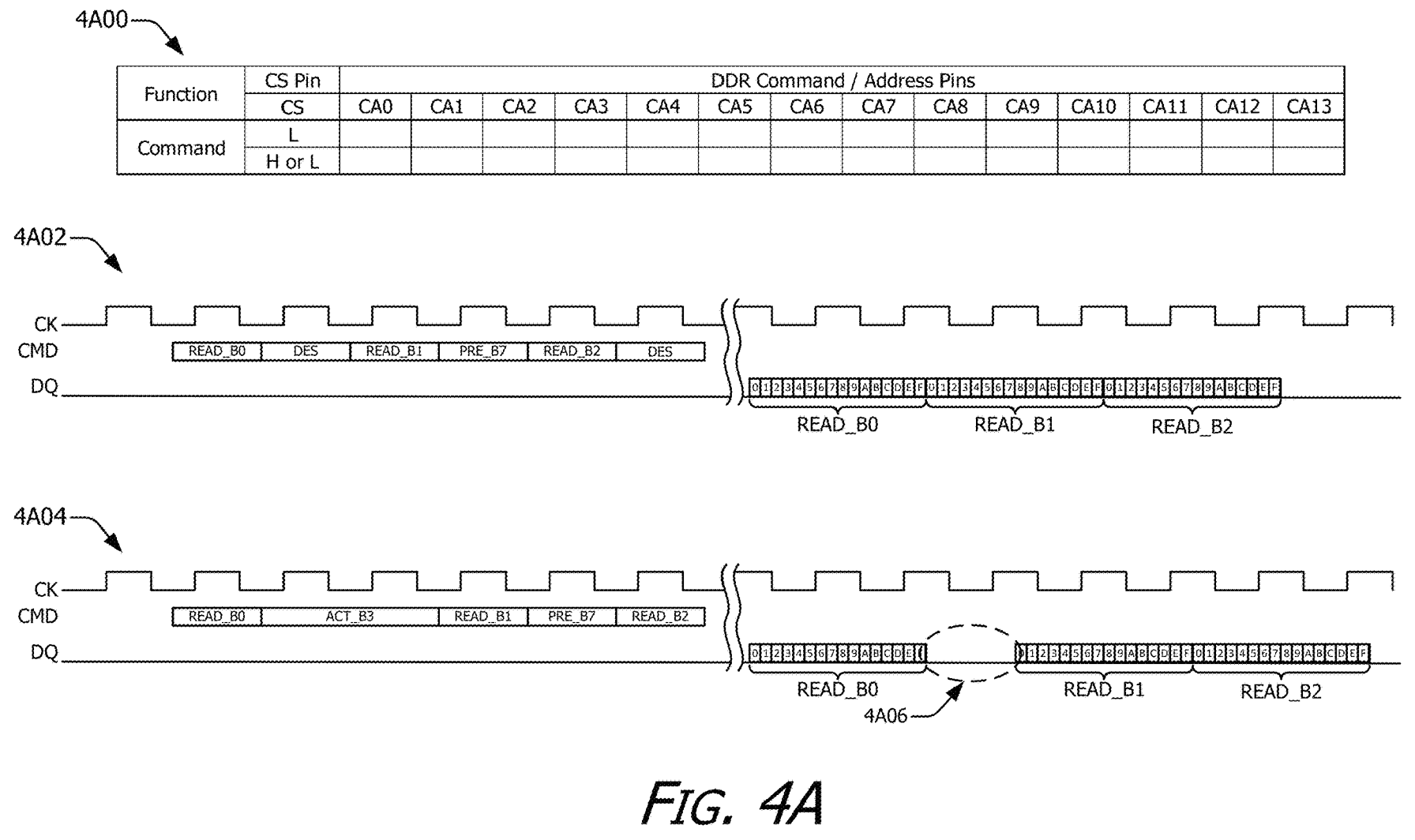

FIG. 4A illustrates an example command interface through which aspects of an efficient command protocol may be implemented;

FIG. 6 illustrates an example command truth table by which aspects of an efficient command protocol may be implemented;

FIG. 7 illustrates additional examples of a command truth table by which aspects of an efficient command protocol may be implemented;

FIG. 8 illustrates another example command truth table by which aspects of an efficient command protocol may be implemented;

FIG. 10 illustrates another example method of configuring a command in accordance with an efficient command protocol; and FIG. 11 illustrates another example command truth table by which aspects of an efficient command protocol may be implemented.

DETAILED DESCRIPTION

Overview

Figure 1:
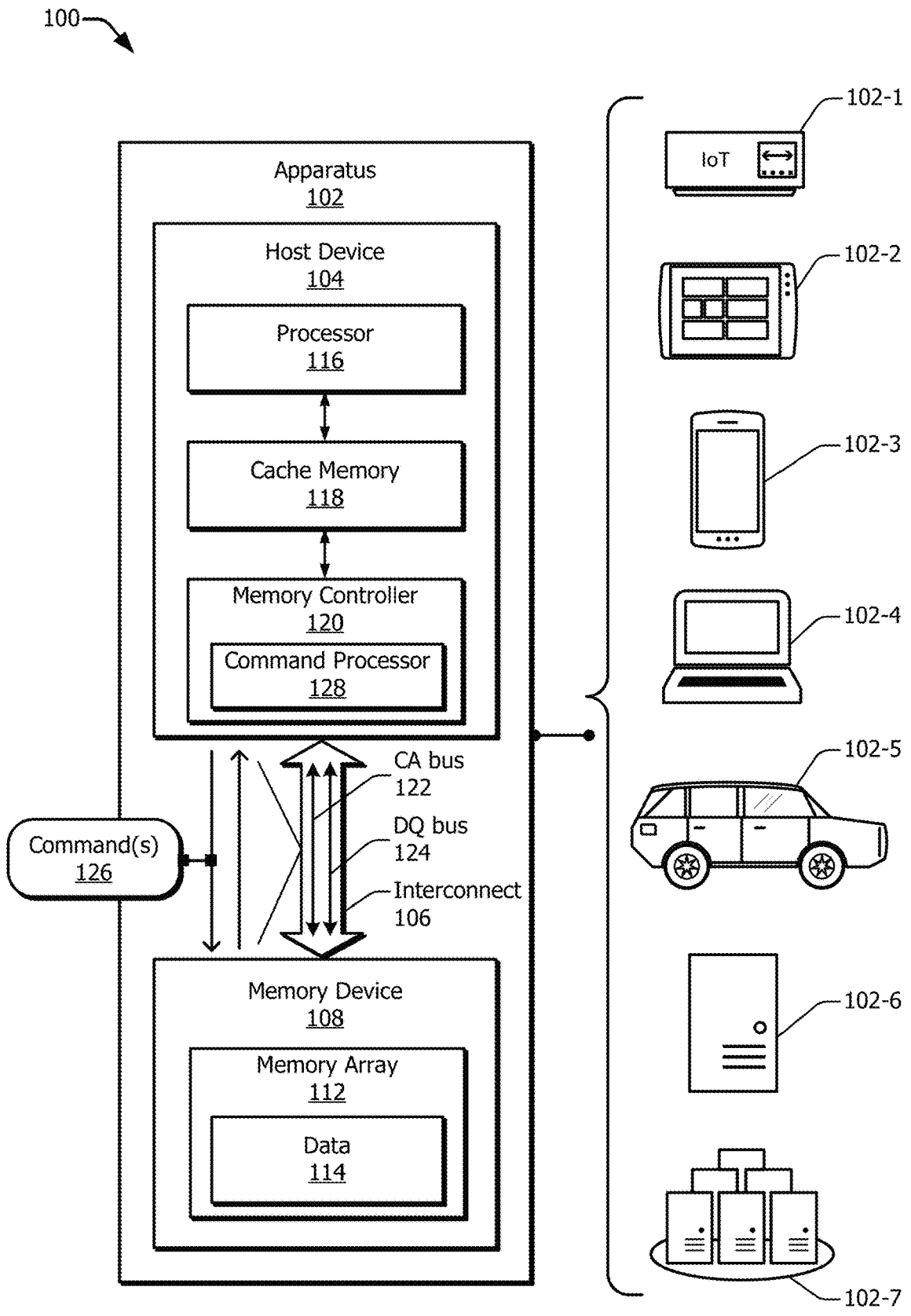
FIG. 1 illustrates an apparatus in which aspects of an efficient command protocol can be implemented for a memory system.

Computers, smartphones, and other electronic devices operate using processors and memories to run a variety of programs and applications, ranging from low-power operating systems and background utilities to computationally intensive applications for high-resolution graphics, computational simulations, artificial intelligence (AI), and so forth. Execution speeds associated with these programs and applications are often related to the performance of a memory of the device, which is contingent, in part, on a frequency of clock signals and commands used to enable and coordinate operation of the memory.

By way of review, a memory device operates based on clock signals by which data is transferred between a memory controller and the memory device. To increase data transfer rates, the memory controller can increase a clock frequency or operating frequency of the memory device. For example, a typical clock/command (CLK/CA) interface for Double Data Rate 5 (DDR5) memory deployed in server or non-mobile devices operates by using a command clock (CK) for data transfers, therefore the CK rate and the data rate are the same. In other words, the DDR5 architecture operates in 1N operation, where 1N indicates a ratio of the write clock (WCK) clock of the DQ bus to the command clock (CK), or a WCK2CK ratio, of 1:1. Generally, for DDR implemented in server systems, key parameters for the memory system are system power budget, performance optimization with high CA pin counts and delay lock loop (DLL) timing, and DQ to CLK speed rates of 1:1 that operate with DLL lock required. Further, server memory module and package configurations are typically implemented as 2 rank ×4 (40 DRAMs per module) or 4/8 rank ×4 (80-160 DRAMs per module) for reliability, availability, and serviceability (RAS).

With respect to command ratios, server-based DDR5 typically operates with activation (ACT) to read/write commands ratios of ~1:1, with highest operational power consumed by one bank act-pre current (IDD0: ACT-PRE), and background power consumption and system level behavior characterized primarily by active standby current (IDD3N) for a number of activated banks per channel. Additionally, server DRAMs operate without power-down or self-refresh (SREF), and have pads or contacts centrally located under a package and operate from a nominal supply voltage (VDD) of 1.1 volts. These configuration details and the associated clocking interface for server or non-low-power DDR5 implementations may provide sufficient command bandwidth, however, power consumption is often too high due to using an excessive number of CA pins and the fast operation CK/CA speeds associated with the described 1N operation. For example, operating a memory interface with the same CK and DQ data rates typically increases levels of power consumption for CK/CA input buffers (IBs) relative the speed and the number of IBs for DDR5.

As another example, consider low-power DD5 memory (LPDDR5), which is often configured as a dual clocking architecture, where WCK2CK ratio=4:1 for high speed (e.g., greater than 3200 Mbps) or where the WCK2CK ratio can be either 4:1 or 2:1 for low speed (e.g., equal to or less than 3200 Mbps). Generally, for LPDDR or mobile systems, key parameters for the memory system are battery life in day-of-use for the system, performance optimization with low CA pin counts, and dynamic frequency changes given varying workloads to enable power savings. In low-power or mobile systems, DQ to CLK speed rates may be 4:1 with a dual clocking architecture with WCK2CK sync (DLL lock not required). Further, mobile memory module and package configurations are typically implemented as ½ rank ×16 (4/8/16 DRAMs per package). With respect to command ratios, low-power DDR5 typically operates with ACT to read/write commands ratios of ~1:2, with highest operational power consumed read/write operations (IDD4), and background power consumption and system level behavior characterized primarily by pre-charge power-down (PD) usage and duration.

Additionally, mobile or low-power DRAMs can use power-down or self-refresh (SREF) to reduce power consumption, and have pads or contacts located on edges of a package and operate from a nominal VDD of 0.95-1.05 volts. Given these design parameters and details, such as the VDD level, pad location, and lack of DLL, low-power or mobile DDR5 may operate with relaxed timing. While these design parameters and the LP5 clocking schemes may improve power consumption, a common bandwidth of the LP5 architecture can be suboptimal or very challenging to use efficiently with a bit-length 16 (BL16) formatting of commands. For example, such an architecture may improve CA pin use, slow CK/CA speeds, enable 2N operation for ACT/MRW commands, however, ACT commands in 2N operation limits system performance due to command format and/or timing. Thus, preceding command clocking techniques fail to address bandwidth and/or power consumption issues associated with command bus usage.

In contrast with preceding clocking techniques, this document describes apparatuses and techniques for an efficient command protocol for memory access. In various aspects, a memory controller may implement combination/combined operations (combo operations) of different command types to better utilize a multiple clock ratio of a command bus (e.g., WCK2CK ratio=4:1). By so doing, the efficient command protocol may improve power efficiency and system level performance of a computing system. Generally, the efficient command protocol may implement commands for a combination of operations, which may utilize the command bus more efficiently. For example, a command formed in accordance with the efficient command protocol described herein may be configured to implement a (1.5+0.5)N operation along with a 1N operation using a WCK2CK ratio=4:1 for the power efficiency and system level performance. Thus, a memory controller may combine operations of different types to utilize one of the multiple command slots or windows created by the multiple timing scheme, which may include a WCK2CK ratio=4:1 implemented by DDR5 in a low-power or mobile system. As an example, the memory controller may use, form, or communicate an ACT (1.5N) operation with READ/WRITE/PRE command (0.5N), e.g., an ACT_B3 followed by READ_B1, operation for 2N command slots or windows of the 4N command timing. By so doing, the memory controller may improve power efficiency and system level performance of a computing system. These are but a few examples of implementing an efficient command protocol, other examples of which are described throughout this disclosure.

Example Operating Environments

FIG. 1 illustrates at 100 an apparatus 102 in which aspects of an efficient command protocol for memory access can be implemented. The apparatus 102 can include, for example, an internet-of-things (IoT) device 102-1, tablet device 102-2, smartphone 102-3, notebook computer 102-4, an automobile 102-5, server computer 102-6, server cluster 102-7 that may be part of cloud computing infrastructure or a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, public transportation device, drone, industrial equipment, security device, sensor, or an electronic component thereof. These example apparatus configurations can include one or more components to provide various computing functionalities, data processing, and/or features.

In example implementations, the apparatus 102 can include at least one host device 104, at least one interconnect 106, and at least one memory device 108. In some instances, aspects of the apparatus 102 may be distributed across multiple electronic devices (e.g., the host device 104 may be incorporated as part of the IoT device 102-1, tablet device 102-2, or smartphone 102-3 while the memory device 108 may be incorporated as part of a discrete, packaged component or as part of a memory module of the device).

The memory device 108 may be realized, for example, with a dynamic random-access memory (DRAM) die or module, including a three-dimensional (3D) stacked DRAM device, such as a high bandwidth memory (HBM) device or a hybrid memory cube (HMC) device. The memory device 108 may operate as a main memory. Although not shown, the apparatus 102 can also include storage memory. The storage memory may be realized, for example, with a storage-class memory device, such as one employing 3D XPoint™ or phase-change memory (PCM), a hard disk or solid-state drive, or flash memory. The memory device may include at least one memory array 112 (e.g., at least one memory bank) having memory cells arranged in rows and columns. Generally, the host device 104 may store data 114 to the memory array 112 and/or read the data 114 from the memory array 112 in accordance with various aspects of an efficient command protocol.

The host device 104 can include at least one processor 116, at least one cache memory 118, and at least one memory controller 120. Regarding the host device 104, the processor 116 is coupled to the cache memory 118, and the cache memory 118 may be coupled to the memory controller 120. The processor 116 is also coupled, directly or indirectly, to the memory controller 120. The host device 104 may include other components to form, for instance, a system-on-a-chip (SoC). The processor 116 may include or comprise a general-purpose processor, a central processing unit (CPU), a graphics processing unit (GPU), a neural network engine or accelerator, an application-specific integrated circuit (ASIC), a field-programmable gate array (FPGA) integrated circuit (IC), a communications processor (e.g., a modem or baseband processor), an SoC, and so forth.

The memory controller 120 may be coupled to a physical interface (e.g., a high-level or logical interface) between the processor 116 and at least one memory (e.g., a memory that is external to the host device 104, such as the memory device 108). The memory controller 120 can, for example, communicate memory commands or requests in accordance with an efficient command protocol from the processor 116 and provide the memory requests to a memory array with appropriate formatting, timing, and reordering in accordance with a memory access protocol or specification (e.g., protocols of a Low-Power Double Data Rate 5 (LPDDR5), Low-Power Double Data Rate 6 (LPDDR6), or subsequent low-power DDR specification). The memory controller 120 can also forward to the processor 116 responses to the memory requests that the memory controller 120 receives from the external memory.

Regarding connections that are external to the host device 104, the host device 104 can be coupled to the memory device 108 via the interconnect 106. The memory device 108 may be coupled to a storage memory (not shown). The depicted interconnect 106, as well as other interconnects (not shown) that communicatively couple together various components, enable data to be transferred between two or more components of the various components. Interconnect examples include a bus, a switching fabric, one or more wires that carry voltage or current signals, a test interface such as a burn-in board or test socket, and so forth. The interconnect 106 can include at least one command and address bus 122 (CA bus 122) and at least one data bus 124 (DQ bus 124). Each bus may be implemented as a unidirectional bus or a bidirectional bus. The interconnect 106 may also include a clock bus (CK bus—not shown) that is part of or separate from the command and address bus 122. The CA and DQ buses 122 and 124 may be coupled to CA and DQ pins, respectively, of the memory device 108. In some implementations, the interconnect 106 may also include a chip-select (CS) I/O (not shown) that can, for example, be coupled to one or more CS pins of the memory device 108.

The depicted components of the apparatus 102 represent an example computing architecture with a hierarchical memory system. A hierarchical memory system may include memories at different levels, with each level having a memory with a different speed or capacity. As shown, the cache memory 118 is logically coupled between the processor 116 and the memory controller 120. Here, the cache memory 118 is at a higher level of the hierarchical memory system than is the memory device 108. A storage memory, in turn, can be deployed at a lower level than the main memory as represented by the memory device 108. At lower hierarchical levels, memories may have decreased speeds but increased capacities relative to memories at higher hierarchical levels.

Although various implementations of the apparatus 102 are depicted in FIG. 1 and described herein, an apparatus 102 can be implemented in alternative manners. For example, the host device 104 may include multiple cache memories, including multiple levels of cache memory, or may have no cache memory. In some cases, the host device 104 may omit the processor 116 or the memory controller 120. A memory, such as the memory device 108, may have a respective "internal" or "local" cache memory (not shown). Further, there may be a cache memory between the host device 104 and the memory device 108. Generally, the illustrated and described components may be implemented in alternative ways, including in distributed or shared memory systems. A given apparatus 102 may also include more, fewer, or different components.

The host device 104 and the various memories may be realized in multiple manners. In some cases, the host device 104 and the memory device 108 can both be disposed on, or physically supported by, a same PCB (e.g., a rigid or flexible motherboard). The host device 104 and the memory device 108 may additionally be integrated on a same IC or fabricated on separate ICs but packaged together. A memory device 108 may also be coupled to multiple host devices 104 via one or more interconnects 106 and may be able to respond to memory requests from two or more of the host devices 104. Each host device 104 may include a respective memory controller 120, or the multiple host devices 104 may share a common memory controller 120. An example computing system architecture with at least one host device 104 that is coupled to a memory device 108 is described below with reference to FIG. 2.

The electrical paths or couplings realizing the interconnect 106 can be shared between two or more memory components (e.g., modules, dies, banks, or bank groups). In some implementations, the CA bus 122 is used for transmitting addresses and commands from the memory controller 120 to the memory device 108, which transmitting may be to the exclusion of propagating data. The DQ bus 124 can propagate data between the memory controller 120 and the memory device 108. The memory device 108 may include or be configured with multiple memory banks (not shown in FIG. 1). The memory device 108 may be realized with any suitable memory and/or storage facility including, but not limited to: Dynamic Random-Access Memory (DRAM), Synchronous DRAM (SDRAM), three-dimensional (3D) stacked DRAM, DDR DRAM, or Low-Power DDR (LPDDR) memory, including LPDDR DRAM and LPDDR SDRAM. The memory device 108 may be described in terms of forming at least part of a main memory of the apparatus 102. The memory device 108 may, however, form at least part of a cache memory, a storage memory, an SoC, and so forth of an apparatus 102.

In aspects on an efficient command protocol, the host device 104 (e.g., the memory controller 120 of the host device 104) may transmit a series of one or more command(s) 126 to the memory device 108 that direct the memory device 108 to perform various operations associated with memory access (e.g., to write and/or data), memory device configuration, memory device status, or the like. Generally, the memory controller 120 or a command processor 128 may issue any suitable type of command 126 to the memory device 108 via an interface that includes a set of clock (CK) pins/lines, command (CA) pins/lines, data (DQ) pins/lines, address pins/lines, and so forth. For example, the memory controller 120 or command processor 128 may communicate, as part of a memory write operation or a memory read operation, an Activation (ACT) command relating to sensing and/or amplifying data from a target row into a row buffer, a read/write (RD/WR) command relating to the transfer of data to/from the row buffer to/from a memory bus, or a Pre-charge (PRE) command that relates to clearing the row buffer and prepares a subarray for subsequent read/write operations (e.g., pre-charges the bit lines). Other commands 126 may include one or a combination of a mode register write (MRW) command, a multi-purpose command (MPC), or a mode register read (MRR) command. In aspects, the command(s) 126 can be communicated through the interconnect 106 (e.g., using the CA bus 122) in accordance with implementations of an efficient command protocol as described herein.

Figure 2:
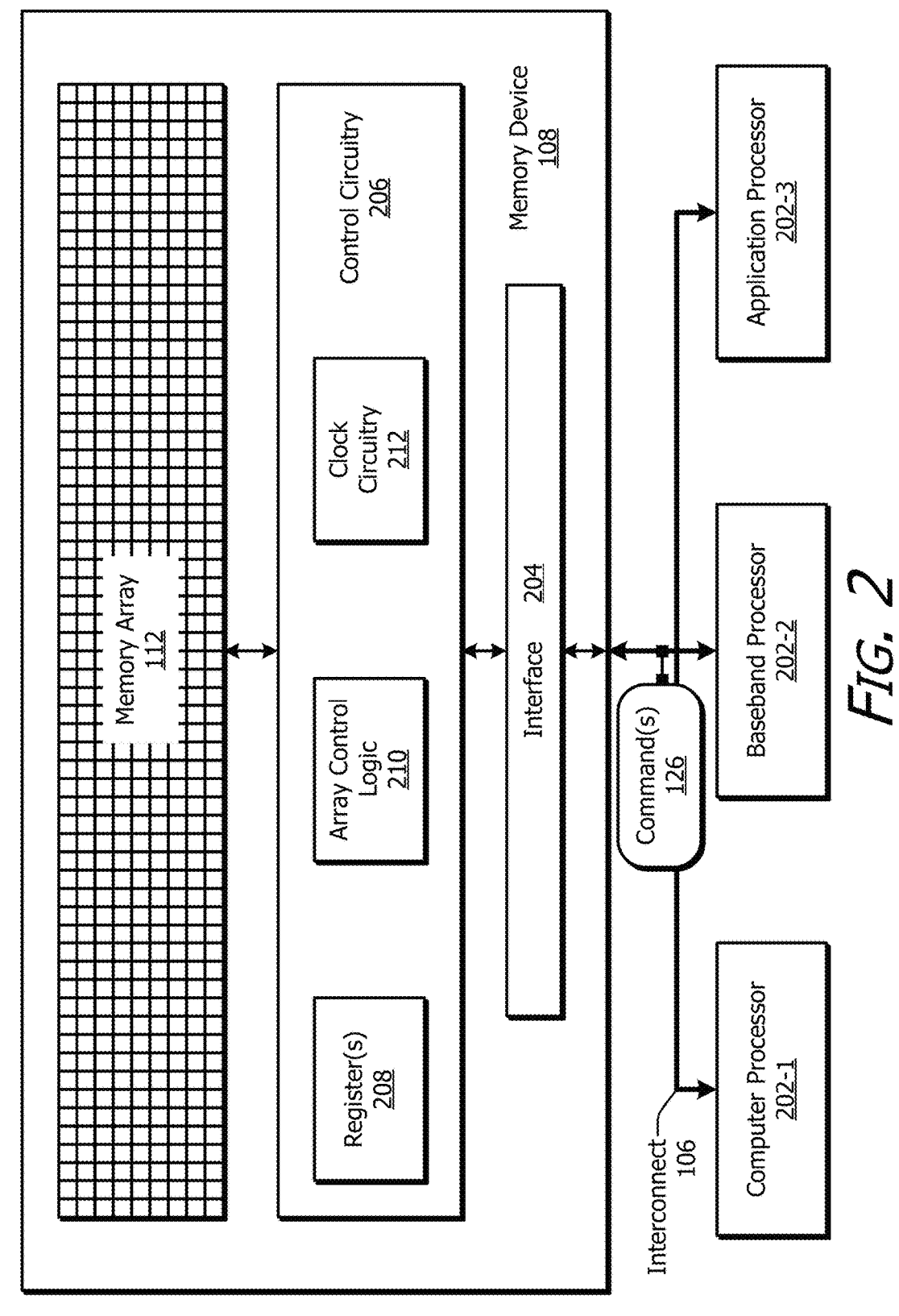
FIG. 2 illustrates example computing systems that can implement aspects of an efficient command protocol.

FIG. 2 illustrates an example computing system 200 that can implement aspects of an efficient command protocol. In some implementations, the computing system 200 includes at least one memory device 108, at least one interconnect 106, and at least one processor 202. One or more of the processors 202, or memory controllers thereof (not shown), may communicate commands 126 with the memory device 108 via the interface 106 in accordance with aspects of an efficient command protocol. In some implementations, a processor 202 or memory controller 120 includes a command processor 128 and/or command queue, which may receive or store commands received from a host device.

Although the memory array 112 may include a row-and-column architecture, other architectures of memory cells may be included in the memory device 108.

Furthermore, the memory device 108 can include least one interface 204 and control circuitry 206 that is communicatively corresponding to the memory array 112. The memory device 108 can correspond to a main memory or a storage memory of the computing system and/or the apparatus 102 of FIG. 1. Thus, the memory array 112 can include an array of memory cells, including but not limited to memory cells of Dynamic Random-Access Memory (DRAM), Synchronous DRAM (SDRAM), three-dimensional (3D) stacked DRAM, Double Data Rate (DDR) memory, low-power Dynamic Random-Access Memory (DRAM), or Low-Power Double Data Rate (LPDDR) Synchronous Dynamic Random-Access Memory (SDRAM). The memory array 112 and the control circuitry 206 may be components on a single semiconductor die or on separate semiconductor dies. The memory array 112 or the control circuitry 206 may also be distributed across multiple dies.

The control circuitry 206 can include any of a number of components that can be used by the memory device 108 to perform various operations. These operations can include communicating with other devices, managing performance, and performing memory read or write operations. For example, the control circuitry 206 can include one or more register(s) 208, at least one instance of array control logic 210, clock circuitry 212, and any other suitable circuitry useful for memory access and/or control (not shown).

The array control logic 210 may be implemented as circuitry that can provide command decoding, address decoding, input/output functions, amplification circuitry, power supply management, power control modes, and other functions. The clock circuitry 212 may be implemented as circuitry that can provide synchronization of various components of the memory device 108 with one or more external clock signals that may be provided over the interconnect 106, such as a command/address clock (e.g., CK_t or CK_c) or a data clock (e.g., WCK_t or WCK_c), and/or with at least one clock signal that is generated internally.

The interface 204 can couple the control circuitry 206 or the memory array 112 directly or indirectly to the interconnect 106. As shown in FIG. 2, the register(s) 208, the array control logic 210, and the clock circuitry 212 can be part of a single component (e.g., the control circuitry 206). In other implementations, one or more of the register(s) 208, the array control logic 210, or the clock circuitry 212 may be implemented as separate components, which can be provided on a single semiconductor die or disposed across multiple semiconductor dies. These components of the control circuitry 206 may be individually or jointly coupled to the interconnect 106 via the interface 204. The control circuitry 206, in general, may be configured to read operands from or write operands to at least one register(s) 208.

The interconnect 106 may be implemented with any one or more of a variety of interconnects that communicatively couple together various components and enable commands, addresses, and/or other information and data to be transferred between two or more of the various components (e.g., between the memory device 108 and the one or more processors 202). Although the interconnect 106 is represented with a single arrow in FIG. 2, the interconnect 106 may include at least one bus, at least one switching fabric, one or more wires or traces that carry voltage or current signals, at least one switch, one or more buffers, and so forth. Further, the interconnect 106 may be separated into at least a command-and-address (CA) bus 122, a clock bus (CK, not shown), and a data (DQ) bus 124 (as depicted in FIG. 1).

In some aspects, the memory device 108 may be realized as a "separate" physical component relative to the host device 104 (of FIG. 1) or any of the processors 202. Examples of physical components that may be separate include, but are not limited to, a printed circuit board (PCB), which can be rigid or flexible; a memory card; a memory stick; and a memory module, including a single in-line memory module (SIMM) or a dual in-line memory module (DIMM). Thus, separate physical components may be located together within a same housing of an electronic device or may be distributed over a server rack, a data center, and so forth. Alternatively, the memory device 108 may be packaged or integrated with other physical components, including a host device 104 or a processor 202, such as by being combined on a common PCB or together in a single device package or by being integrated into an SoC.

The apparatuses and methods that are described herein may be appropriate for memory that is designed for double data-rate (DDR) operations or that is targeted for energy-efficient applications. Thus, the described principles may be incorporated into a DDR memory device. An example of a memory standard that relates to DDR applications is the low-power DDR5 synchronous DRAM (DDR5 SDRAM) as promulgated by the Joint Electron Device Engineering Council (JEDEC) Solid State Technology Association. Some terminology in this document may draw from one or more of these standards or versions thereof, like the low-power DDR5 standard or low-power DDR6 standard, for clarity. The described principles, however, are also applicable to memories that comport with other standards, including other DDR standards (e.g., earlier versions such as DDR4 SDRAM or future versions like DDR6 SDRAM), and to memories that do not adhere to a public standard.

As shown in FIG. 2, the one or more processors 202 may include a computer processor 202-1, a baseband processor 202-2, and an application processor 202-3, which are corresponding to the memory device 108 through the interconnect 106. The processors 202 may each be, or may form a part of, a CPU, a GPU, an SoC, an ASIC, an FPGA, or the like. In some cases, a single processor can comprise multiple processing resources, each dedicated to different functions, such as modem management, applications, graphics, central processing, or the like. In some implementations, the baseband processor 202-2 may include or be coupled to a modem (not shown in FIG. 2) and may be referred to as a modem processor. The modem and/or the baseband processor 202-2 may be coupled wirelessly to a network via, for example, cellular, Wi-Fi®, Bluetooth®, near field, or another technology or protocol for wireless communication.

In some implementations, the processors 202 may be connected directly to the memory device 108 (e.g., via the interconnect 106 as shown). In other implementations, one or more of the processors 202 may be indirectly connected to the memory device 108 (e.g., over a network connection or through one or more other devices). Further, each processor 202 may be realized similarly to the processor 116 of FIG. 1. Accordingly, a respective processor 202 can include or be associated with a respective memory controller, like the memory controller 120 depicted in FIG. 1. Alternatively, two or more processors 202 may access the memory device 108 using a shared or system memory controller 120.

Figure 9:
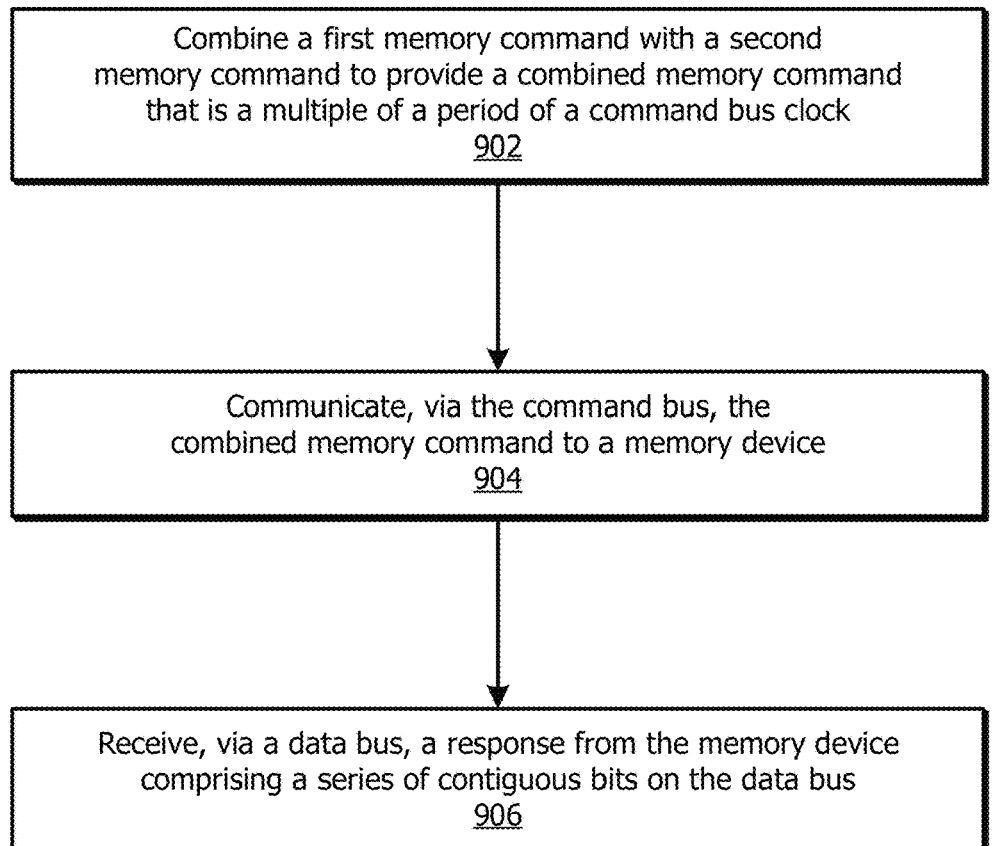
FIG. 9 illustrates an example method of configuring a command in accordance with an efficient command protocol.

Additional details of operations related to implementations of an efficient command protocol are described throughout this disclosure. FIG. 4A describes an example command interface for communicating commands of an efficient command protocol, FIG. 4B describes example command activation formats for low-power memory, FIG. 5 describes an example command structure that may be implemented in accordance with an efficient command protocol, and FIG. 6 describes an example command truth table by which aspects of an efficient command protocol may be implemented. Further, FIG. 7 illustrates additional examples of a command truth table by which aspects of an efficient command protocol may be implemented, FIG. 8 illustrates another example command truth table by which aspects of an efficient command protocol may be implemented, while FIGS. 9 and 10 depict example methods of an efficient command protocol in relation to the host device 104, memory device 108, memory controller 120, and/or command processor 128. FIG. 11 illustrates an additional example of a command truth table by which aspects of an efficient command protocol may be implemented. However, example hardware realizations of the memory device 108 are described next with reference to FIG. 3.

Figure 3:
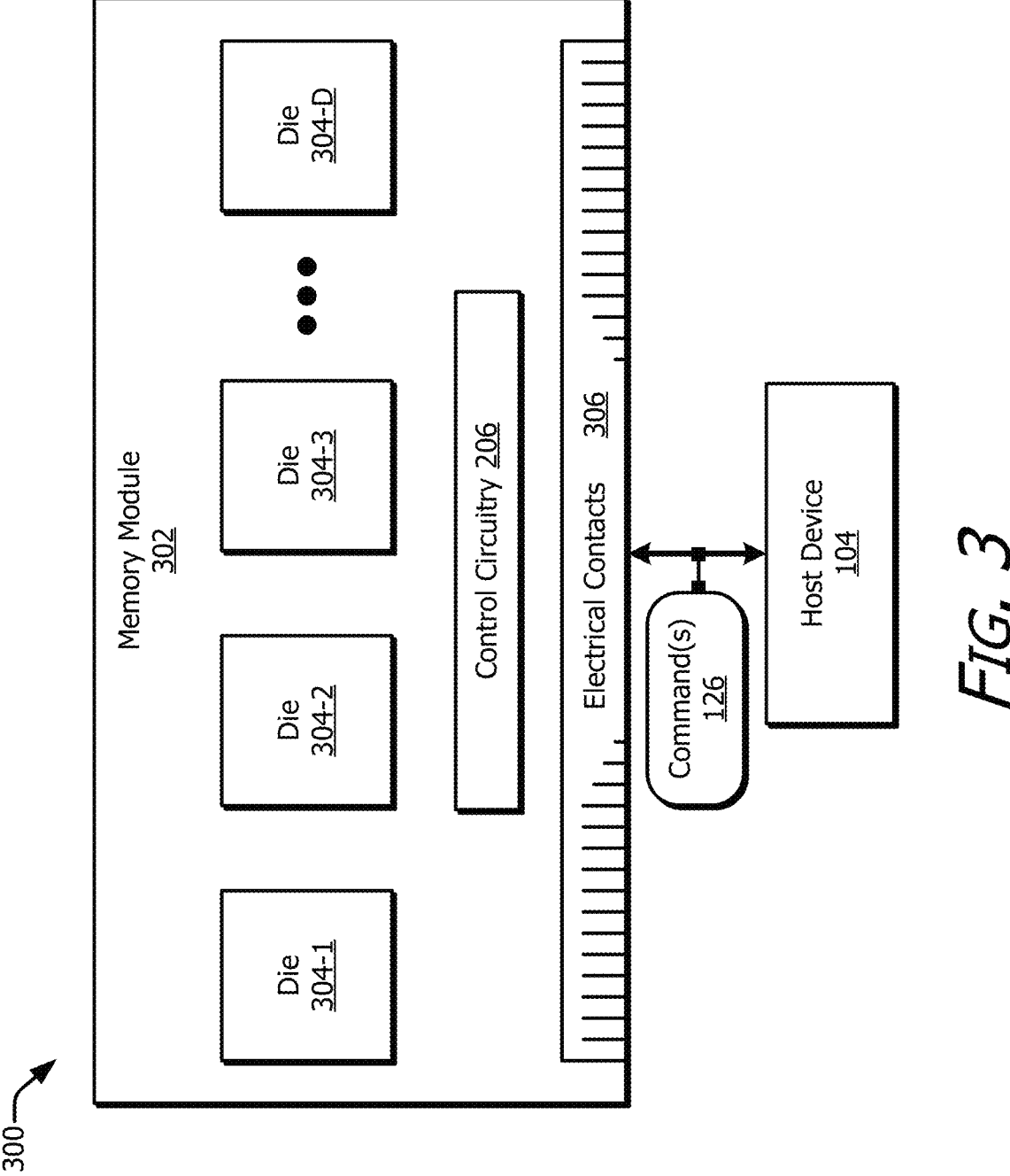
FIG. 3 illustrates an example memory module that may operate in accordance with an efficient command protocol.
Figure 4B:
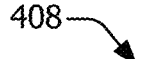
FIG. 4B illustrates an example command activation formats for low-power memory.

FIG. 3 illustrates memory device examples at 300. An example memory module 302 includes multiple dies 304, which may be coupled to an instance of control circuitry 206. As depicted, the memory module 302 includes a first die 304-1, a second die 304-2, a third die 304-3, . . . , and a D$^{th}$ die 304-D, with "D" representing a positive integer. The memory module 302 can be realized as a SIMM or a DIMM, just to name a couple of examples. A memory device 108 can correspond, for example, to a single die 304, multiple dies 304-1 . . . 304-D, a memory module 302 with at least one die 304, and so forth. As shown, the memory module 302 can include one or more electrical contacts 306 (e.g., pins, edge connectors) to interface the memory module 302 to other components.

The memory module 302 can be implemented in various manners. For example, the memory module 302 may include a PCB, and the multiple dies 304-1 . . . 304-D may be mounted or otherwise disposed on the PCB. The dies 304 (e.g., memory dies) may be arranged in a line or along two or more dimensions (e.g., like a grid or array). The dies 304 may have a common size or may have different sizes. Each die 304 may be like one or more other dies 304 or may be unique on a given memory module 302 in terms of size, shape, data capacity, control circuitries, and so forth. Dies 304 may also be distributed on multiple sides of the memory module 302.

One or more of the dies 304 may be encapsulated in a package, such as a ball grid array (BGA) package that is mounted to the memory module 302. In such instances, a pinout of the BGA package may correspond to a JEDEC standard, such as JESD79-5. Electrically conductive traces of the memory module (e.g., within or on the PCB) may electrically couple the dies 304 to the electrical contacts 306.

In some instances, the electrical contacts 306 may electrically couple the memory module to a host device via an interconnect (e.g., the host device 104 of FIG. 1). For example, the host device 104 as shown in FIG. 3 may communicate commands 126 with the control circuitry 206 via the electrical contacts of the memory module 302. Alternatively or additionally, a memory controller or command processor may implement aspects of an efficient command protocol as described herein to issue commands to the memory module 302. Generally, the host device 104 may communicate with one or more of the dies 304 through the electrical contacts 306 using commands 126 formatted and/or communicated in compliance with an efficient command protocol as described herein. Alternatively, a host device 104 can access a die 304 "directly" prior to being mounted to the PCB of the memory module 302.

FIG. 4A illustrates at 400 an example command interface through which aspects of an efficient command protocol may be implemented. In this example, an example DDR5 command interface 400 or command (CA) bus is illustrated with command/address pins CA0-CA13 and a chip select (CS) pin. As noted, a typical CLK/CA interface for DDR5 memory operates by using the CK for data transfers, therefore the CK rate and the data rate are the same. In other words, the DDR5 architecture operates in 1N operation or a WCK2CK ratio of 1:1. While the DDR5 CLK/CA interface may provide sufficient command bandwidth, power consumption is often too high due to using an excessive number of CA pins and the fast operation CK/CA speeds associated with 1N operation. For example, operating the memory interface with the same CK and data rates typically consumes increased levels of power for CK/CA IBs for the speed and the number of IBs for DDR5. Further, as shown at 402, a dual clocking LP5 architecture, where WCK2CK ratio=4:1, may improve power consumption but a common bandwidth is suboptimal or very challenging to use efficiently with a bit-length 16 (BL16) format for commands. Generally, the dual clocking LP5 architecture may improve CA pin use, slow CK/CA speeds, enable 2N operation for ACT/MRW commands, and 1N operation in other commands. As shown at 404, however, ACT commands in 2N operation limit system performance due to command format and/or timing, which is illustrated as a gap or pause at 406 in received read data from the memory device responsive to the issued read commands (Read_B0, Read_B1, and Read_B2). As such, preceding command clocking techniques fail to address bandwidth and/or power consumption issues associated with command bus usage. In particular, the data (DQ) bus is underutilized, at 406, when no data is being read or written due to the ACT command. Additionally, as another example, FIG. 4B illustrates example command activation formats for low-power memory, which may be implemented as 2N commands.

Figure 5:
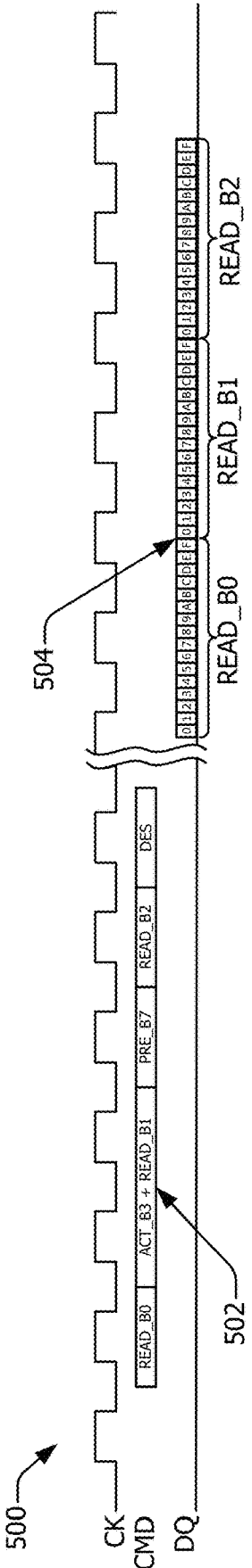
FIG. 5 illustrates an example command structure that may be implemented in accordance with an efficient command protocol.

In contrast with the preceding techniques, aspects of an efficient command protocol can implement combined command operations that may improve power efficiency and system performance. By way of example, consider FIG. 5 which illustrates at 500 an example command structure that may be implemented in accordance with an efficient command protocol. Generally, the efficient command protocol may implement commands for a combination of operations, which may utilize the command bus more efficiently. In the context of FIG. 5, a command 502 formed in accordance with the efficient command protocol may be configured to implement a (1.5+0.5)N operation along with a 1N operation using WCK2CK ratio=4:1 for the power efficiency and system level performance. As shown at 500, a memory controller may combine operations of different types to utilize one of the multiple command slots created by the multiple timing scheme (e.g., WCK2CK ratio=4:1). Here, the memory controller uses an ACT (1.5N) operation with READ/WRITE/PRE (0.5N) operation, in this case an ACT_B3 followed by (or combined with) READ_B1, for 2N command slots or windows of the 4N command timing. Alternatively, an N command slot may be referred to as a command duration and/or correspond with a period of a clock at which the command bus operates. Additionally, as shown in FIG. 5, the data (DQ) bus is fully utilized at 504 with bits of data being read from or written to the memory device, e.g., there is no gap in the contiguous sequence of bit strings on the data bus.

As another example, FIG. 6 illustrates at 600 a command truth table by which aspects of an efficient command protocol may be implemented. The command truth table may be used to implement any suitable efficient command, such as the example command shown at 500 of FIG. 5. Generally, in the context of the command truth table 600, a combination or combined operation for an ACT (1.5N) command and a READ/WRITE/PRE/REF (0.5N) can be implemented to use a second command at CK F2 edge (as indicated by arrows in FIG. 6). In aspects, the efficient command protocol may enable CA bus/interface pin counts to be selectively configured to reduce or optimize the CA bus. For example, CA pin counts or configurations can be selectively optimized or altered based on Burst Order enabled, e.g., no burst order allowed for this 0.5N example, a number of commands, a maximum memory capacity, a number of banks, a page size, a prefetch size, a pre-charge policy for (1.5+0.5)N operation, to enable an ACT operation followed by PRE operation or REF (refresh) operation depending the system usage, polarity definition can be reversed based on the termination, any combination of these, and so forth.

FIG. 7 illustrates at 702 and 704 additional examples of a command truth table by which aspects of an efficient command protocol may be implemented. In the context of FIG. 7, the efficient command protocol may include or implement various flags, indicators, or addresses as shown in the example command tables, which may include an Auto Pre-charge flag (AP), an All Bank flag (AB), and/or a Burst Order flag (BO). In aspects of the efficient command protocol, a memory controller may use one or more of these flags when implementing efficient commands with non-standard timing (e.g., 0.5N, 1.5N, 2.5N). Generally, any (1.5+0.5)N operation along with a 1N operation can be implemented with the concepts described herein. As indicated in FIG. 7, a combination or combined operation for an ACT (1.5N) command and a READ/WRITE/PRE/REF (0.5N) can be implemented to use a second command at CK F2 edge (falling edge of second clock cycle).

FIG. 8 illustrates at 800 another example command truth table by which aspects of an efficient command protocol may be implemented. In the context of FIG. 8, the efficient command protocol may include or implement various flags, indicators, or addresses as shown in the example command table, which may include a two independent bank pre-charge flag (2PRE) for pre-charging two independent banks, as well as other flags or indicators as described with reference to FIG. 7 or throughout this disclosure. The 2PRE flag may enable more flexibility or configurability than a preceding pre-charge flag (e.g., pre-charge bank). In aspects, an operation using the 2PRE flag may include a timing constraint requirement or parameter for the second bank because the operation may be implemented in serial rather than in parallel. As indicated in FIG. 8, a combination or combined operation for an ACT (1.5N) command and a 2PRE (0.5N) can be implemented to use a second command at CK F2 edge (falling edge of second clock cycle).

Example Methods

Example methods are described in this section with reference to the flow charts and flow diagrams of FIGS. 9 and 10. These descriptions reference components, entities, and other aspects depicted in FIGS. 1-8 by way of example only.

FIG. 9 depicts a flow diagram 900 of an example method for configuring a command in accordance with an efficient command protocol. The flow diagram 900 includes operations 902 through 906, which a memory controller 120 or command processor 128 may perform to implement aspects of the efficient command protocol.

At 902, a memory controller combines a first memory command with a second memory command to provide a combined memory command. In some aspects, the memory controller or command processor combines a first memory command of a host with a second memory command of the host to provide a combined memory command that is a multiple of a period of a clock at which a command bus of the host operates. For example, the memory controller may determine that communication of the first command via the command bus consumes more than one period of the clock at which the command bus operates and in response to determining that the first command communication of the first command consumed more than one period of the clock, combine the first command with the second command. This may include checking a command queue to determine if a second command is available and/or suitable for combining with the first command.

In some implementations, the first memory command includes an activation command and the second memory command may include one of a read command, a write command, a pre-charge command, or a refresh command. The memory controller or command processor may determine that communication of the activation command via the command bus as an uncombined activation command consumes over one command slot or period of the clock at which the command bus operates. For example, the memory controller may select to combine an activation command (1.5N) with one of a read command (0.5N), write command (0.5N), or pre-charge command (0.5N) to form a combined memory command (1.5+0.5)N operations. Further, the memory controller may further append or combine additional read, write, or pre-charge commands for form a combined command or a command sequence of 3N operations, which may improve or fully utilize a window on a data bus for data written to or read from a memory device.

At 904, the memory controller communicates the combined memory command to a memory device via the command bus. The memory controller may communicate the combined command over an integer number of command bus clock periods or cycles. In some implementations, a second command of the combined memory command or command sequence is communicated on the falling edge of a second clock cycle of the command bus (CK F2). When the second command is a write command, the memory controller may also communicate data to the memory device on the DQ bus. In some cases, the combined memory command is a second command in a series of multiple commands sent to the memory device. For example, the memory controller may send a first command, the combined memory command as the second command, and then a third command.

At 906, the memory controller receives, via a data bus, a response from the memory device comprising a series of contiguous bits on the data bus. Alternatively or additionally, the response may include a sequential sequence of responses or transactions on the data bus responsive to multiple data commands (e.g., read commands, write commands, read/write commands) that include the combined memory command. The series of contiguous bits or continuous response on the data bus generally lacks any break or pause of empty bits, which was typically associated in a pause on the command bus attributed to communicating commands that occupied more than one command slot. In other words, the DQ bus may be more or fully utilized with data bits read from and/or written to the memory device, such that the DQ bus idle time is reduced or minimized, thereby improving system efficiency.

FIG. 10 illustrates another example method of configuring a command in accordance with an efficient command protocol. The flow diagram 1000 includes operations 1002 through 1006, which a memory controller 120 or a command processor 128 may perform to implement aspects of the efficient command protocol.

At 1002, a memory controller determines that an activation command is queued. Alternatively, the memory controller may receive a memory request from a host that results in the generation of the activation command. In some cases, the memory controller generates the activation command based on or responsive to host activity. In aspects, the activation command may be buffered in a command queue for transmission to a memory device.

At 1004, the memory controller selects a command to combine with the activation command to form a combined command sequence. For example, the memory controller may determine or select a read command, write command, pre-charge command, or a refresh command to combine with the activation command to form the combined command sequence or combined command. In aspects, the memory controller may also combine the two commands (1.5+0.5)N with one or more other commands (1N) for form a command sequence of 3N operation.

Optionally at 1006, the memory controller asserts or sets a flag or indicator useful to implement the combined command sequence. For example, the memory controller may use or assert an indication of an Auto Pre-charge flag (AP), All Bank flag (AB), a Burst Order flag (BO), or 2PRE command flag to the memory device. In aspects, the flag or indicator may be communicated to the memory devices with the combined memory command, and the flag or the indication may be useful to implement the combined memory command.

At 1008, the memory controller communicates the combined command sequence to a memory device via a command bus. The memory controller may communicate the command sequence over an integer number of command bus clock periods or cycles. In some implementations, a second command of the command sequence is communicated on the falling edge of a second clock cycle of the command bus (CK F2). When the second command is a write command, the memory controller may also communicate data to the memory device on the DQ bus.

Optionally at 1010, the memory controller communicates a third command to the memory device via the command bus. For example, the second command combined with the activation command may include a read command and the third memory command may include another read command. In some cases, the second memory command is a write command and the third memory command is another write command. In yet other cases, the second memory command is the pre-charge command and the third memory command is a read command or the second memory command is the refresh command and the third memory command is a read command. Thus, the memory controller may communicate the combined command of (1.5+0.5)N command slots or clock periods with one or more other commands (1N) for form a command sequence of a 4N operation to execute three commands (e.g., FIG. 5).

At 1012, the memory controller receives, via a data bus, a response from the memory device for the combined command sequence that includes a contiguous group of bits on the data bus. As noted, the contiguous group of bits may include data from a sequence of commands that includes the combined command (e.g., three data reads of a 4N read operation with a combined read command). In other words, the DQ bus may be more or fully utilized with data bits read from and/or written to the memory device, such that the DQ bus idle time is reduced or minimized, thereby improving system efficiency.

For the flow charts and flow diagrams described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

FIG. 11 illustrates at 1100 another example command truth table by which aspects of an efficient command protocol may be implemented. In the context of FIG. 11, the efficient command protocol may include or implement various flags, indicators, or addresses as shown in the example command table, which enable operations that can be implemented with formats of BL32 and beyond. Alternatively or additionally, as indicated in FIG. 11, a combination or combined operation for an ACT (1.5N) command and a read, write, or PRE (0.5N) can be implemented to use a second command at CK R4 edge (rising edge of fourth clock cycle).

Aspects of these methods or operations may be implemented in, for example, hardware (e.g., fixed-logic circuitry or a processor in conjunction with a memory), firmware, or some combination thereof. The methods may be realized using one or more of the apparatuses, systems, or components shown in FIGS. 1-8, the components of which may be further divided, combined, rearranged, and so on. The devices, systems, and components of these figures generally represent firmware, such as executable-code or the actions thereof; hardware, such as electronic devices, packaged modules, IC chips, or circuits; software, such as processor-executable instructions; or a combination thereof. The illustrated apparatuses 100 and components of 200, include, for instance, a memory controller 120 that is configured to implement the efficient command protocol. Thus, these figures illustrate some of the many possible systems or apparatuses capable of implementing the described methods.

Computer-readable media includes both non-transitory computer storage media and communication media including any medium that facilitates transfer of a computer program (e.g., an application) or data from one entity to another. Non-transitory computer storage media can be any available medium accessible by a computer, such as RAM, ROM, Flash, EEPROM, optical media, and magnetic media.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

In the following, various examples for implementing an efficient command protocol for memory access are described:

Example 1: A method comprising: combining a first memory command of a host with a second memory command of the host to provide a combined memory command that is a multiple of a period of a clock at which a command bus of the host operates; communicating, via the command bus, the combined memory command to a memory device; and receiving, responsive to the combined memory command and via a data bus, a response from the memory device comprising a series of contiguous bits on the data bus.

Example 2: The method recited in example 1 or any other example, wherein: the first memory command is an activation command; and the second memory command is one of a read command, a write command, a pre-charge command, or a refresh command.

Example 3: The method recited in example 2 or any other example, further comprising: receiving the activation command; or determining that the activation command is queued.

Example 4: The method recited in example 3 or any other example, further comprising: in response to receiving the activation command or determining that the activation command is queued, selecting the one of the read command, the write command, the pre-charge command, or the refresh command to combine with the activation command.

Example 5: The method recited in example 2 or any other example, further comprising communicating, via the command bus, a third memory command, and wherein: the second memory command is the read command and the third memory command is another read command; the second memory command is the write command and the third memory command is another write command; the second memory command is the pre-charge command and the third memory command is a read command; or the second memory command is the refresh command and the third memory command is a read command.

Example 6: The method recited in example 2 or any other example, wherein: communication of the activation command via the command bus as an uncombined activation command consumes over one period of the clock at which the command bus operates; and the communication of the combined command consumes two periods of the clock at which the command bus operates.

Example 7: The method recited in example 1 or any other example, further comprising: communicating, with the combined memory command, a flag or indication to the memory device useful to implement the combined memory command.

Example 8: The method recited in example 7 or any other example, wherein the flag or indication comprises one of: an Auto Pre-charge flag (AP); an All Bank flag (AB); or a Burst Order flag (BO).

Example 9: The method recited in example 1 or any other example, wherein: the first command or the second command are formatted as a 16 bit-length command (BL16 command); or the command bus is configured to operate in compliance with a Low-Power Double Data Rate 5 (LPDDR5) specification or a Low-Power Double Data Rate 6 (LPDDR6) specification.

Example 10: An apparatus comprising: a queue to receive commands from a host; an interface for a memory interconnect comprising a command bus and a data bus; and a command processor configured to: combine a first memory command of the host with a second memory command of the host to provide a combined memory command that is a multiple of a period of a clock at which the command bus of the memory interconnect operates; communicate, via the command bus, the combined memory command to a memory device coupled to the memory interconnect; and receive, responsive to the combined memory command and via the data bus, a response from the memory device comprising a series of contiguous bits on the data bus.

Example 11: The apparatus recited in example 10 or any other example, wherein: the first memory command is an activation command; and the second memory command is one of a read command, a write command, a pre-charge command, or a refresh command.

Example 12: The apparatus recited in example 11 or any other example, wherein the first command is an activation command; prior to the communication of the combined memory command, the command processor communicates a first read command; the second memory command is a second read command; after the communication of the combined memory command, the command processor communicates a third read command; and the series of contiguous bits received on the data bus comprise respective data bits read from the memory device responsive to the first read command, the second read command, and the third read command.

Example 13: The apparatus recited in example 11 or any other example, wherein: communication of the activation command via the command bus as an uncombined activation command consumes over one period of the clock at which the command bus operates; and the communication of the combined command consumes two periods of the clock at which the command bus operates.

Example 14: The apparatus recited in example 10 or any other example, wherein the command processor is further configured to: communicate, with the combined memory command, a flag or indication to the memory device useful to implement the combined memory command.

Example 15: The apparatus recited in example 14 or any other example, wherein the flag or indication comprises one of: an Auto Pre-charge flag (AP); an All Bank flag (AB); or a Burst Order flag (BO).

Example 16: A system comprising: a memory device comprising an array of memory cells; a memory interconnect coupled to the memory device, the memory interconnect comprising a command bus and a data bus; and a memory controller coupled to the memory interconnect, the memory controller configured to: combine a first memory command of a host with a second memory command of the host to provide a combined memory command that is a multiple of a period of a clock at which the command bus of the memory interconnect operates; communicate, via the command bus, the combined memory command to the memory device coupled to the memory interconnect; and receive, responsive to the combined memory command and via the data bus, a response from the memory device comprising a series of contiguous bits on the data bus.

Example 17: The system recited in example 16 or any other example, wherein: the first memory command is an activation command; and the second memory command is one of a read command, a write command, a pre-charge command, or a refresh command.

Example 18: The system recited in example 17 or any other example, wherein: communication of the activation command via the command bus as an uncombined activation command consumes over one period of the clock at which the command bus operates; and the communication of the combined command consumes two periods of the clock at which the command bus operates.

Example 19: The system recited in example 16 or any other example, wherein the memory controller is further configured to: communicate, with the combined memory command, a flag or indication to the memory device useful to implement the combined memory command.

Example 20: The system recited in example 19 or any other example, wherein the flag or indication comprises one of: an Auto Pre-charge flag (AP); an All Bank flag (AB); or a Burst Order flag (BO).

CONCLUSION

Although aspects of an efficient command protocol for memory access have been described in language specific to certain features and/or methods, the subject of the appended claims is not necessarily limited to the specific features or methods described. Rather, the specific features and methods are disclosed as a variety of example implementations of an efficient command protocol.

What is claimed is:

1. A method comprising:
combining an activation command of a host with another memory command of the host to provide a combined memory command, the other memory command comprising a read command, a write command, a pre-charge command, or a refresh command;
communicating, via a command bus of the host and during two periods of a clock at which the command bus operates, the combined memory command to a memory device, wherein communication of the activation command via the command bus as an uncombined activation command consumes over one period of the clock at which the command bus operates; and
receiving, responsive to the combined memory command and via a data bus, a response from the memory device comprising a series of contiguous bits on the data bus.

2. The method of claim 1, further comprising:
receiving the activation command; or
determining that the activation command is queued.

3. The method of claim 2, further comprising:
in response to receiving the activation command or determining that the activation command is queued, selecting the read command, the write command, the pre-charge command, or the refresh command to combine with the activation command.

4. The method of claim 1, wherein the other command is a second memory command, the method further comprises communicating, via the command bus, a third memory command, and wherein:
the second memory command is the read command and the third memory command is another read command;
the second memory command is the write command and the third memory command is another write command;
the second memory command is the pre-charge command and the third memory command is a read command; or
the second memory command is the refresh command and the third memory command is a read command.

5. The method of claim 1, further comprising:
communicating, with the combined memory command, a flag or indication to the memory device useful to implement the combined memory command.

6. The method of claim 5, wherein the flag or indication comprises one of:

an Auto Pre-charge flag (AP);
an All Bank flag (AB); or
a Burst Order flag (BO).

7. The method of claim 1, wherein:
the activation command or the other memory command are formatted as a 16 bit-length command (BL16 command); or
the command bus is configured to operate in compliance with a Low-Power Double Data Rate 5 (LPDDR5) specification or a Low-Power Double Data Rate 6 (LPDDR6) specification.

8. The method of claim 1, wherein the other memory command comprises a second read command, and the method further comprises:
communicating, via the command bus and before communicating the combined memory command, a first read command to the memory device;
communicating, via the command bus and after communicating the combined memory command, a third read command to the memory device, and wherein:
the series of contiguous bits received on the data bus comprise respective data bits read from the memory device responsive to the first read command, the second read command, and the third read command.

9. An apparatus comprising:
a queue to receive commands from a host;
an interface for a memory interconnect comprising a command bus and a data bus; and
a command processor configured to:
combine an activation command of the host with another memory command of the host to provide a combined memory command configured to consume, during communication via the command bus, at least two periods of a clock at which the command bus of the memory interconnect operates, the other memory command comprising a read command, a write command, a pre-charge command, or a refresh command;
communicate, via the command bus and during two periods of the clock at which the command bus of the memory interconnect operates, the combined memory command to a memory device coupled to the memory interconnect, wherein communication of the activation command as an uncombined command consumes over one period of the clock at which the command bus operates; and
receive, responsive to the combined memory command and via the data bus, a response from the memory device comprising a series of contiguous bits on the data bus.

10. The apparatus of claim 9, wherein:
prior to the communication of the combined memory command, the command processor communicates a first read command;
the other memory command comprises a second read command;
after the communication of the combined memory command, the command processor communicates a third read command; and
the series of contiguous bits received on the data bus comprise respective data bits read from the memory device responsive to the first read command, the second read command, and the third read command.

11. The apparatus of claim 9, wherein the command processor is further configured to:
communicate, with the combined memory command, a flag or indication to the memory device useful to implement the combined memory command.

12. The apparatus of claim 11, wherein the flag or indication comprises one of:

an Auto Pre-charge flag (AP);

an All Bank flag (AB); or a Burst Order flag (BO).

13. The apparatus of claim 9, wherein the command processor is further configured to:

receive the activation command; or determine that the activation command is queued.

14. The apparatus of claim 9, wherein the command processor is further configured to:

in response to the reception of the activation command or the determination that the activation command is queued, select the read command, the write command, the pre-charge command, or the refresh command to combine with the activation command.

15. A system comprising:

a memory device comprising an array of memory cells;

a memory interconnect coupled to the memory device, the memory interconnect comprising a command bus and a data bus; and a memory controller coupled to the memory interconnect, the memory controller configured to:

combine an activation command of a host with another memory command of the host to provide a combined memory command configured to consume, during communication via the command bus, a multiple of a period of a clock at which the command bus operates, the other memory command comprising a read command, a write command, a pre-charge command, or a refresh command;

communicate, via the command bus, the combined memory command to the memory device coupled to the memory interconnect, wherein communication of the activation command via the command bus as an uncombined command consumes over one period of the clock at which the command bus operates; and receive, responsive to the combined memory command and via the data bus, a response from the memory device comprising a series of contiguous bits on the data bus.

16. The system of claim 15, wherein the memory controller is further configured to:

communicate, with the combined memory command, a flag or indication to the memory device useful to implement the combined memory command.

17. The system of claim 16, wherein the flag or indication comprises one of:

an Auto Pre-charge flag (AP);

an All Bank flag (AB); or a Burst Order flag (BO).

18. The system of claim 15, wherein the memory controller is further configured to:

receive the activation command; or determine that the activation command is queued.

19. The system of claim 18, wherein the memory controller is further configured to:

in response to the reception of the activation command or the determination that the activation command is queued, select the read command, the write command, the pre-charge command, or the refresh command to combine with the activation command.

20. The system of claim 15, wherein the other command is a second memory command, and the memory controller is further configured to:

communicate, via the command bus, a third memory command, and wherein:

the second memory command is the read command and the third memory command is another read command;

the second memory command is the write command and the third memory command is another write command;

the second memory command is the pre-charge command and the third memory command is a read command; or the second memory command is the refresh command and the third memory command is a read command.

* * * * *